United States Patent
Wai et al.

(10) Patent No.: US 12,281,696 B2
(45) Date of Patent: Apr. 22, 2025

(54) GEAR SYSTEM FOR DRIVE ARM OF TRACTOR

(71) Applicant: HALLIBURTON ENERGY SERVICES, INC., Houston, TX (US)

(72) Inventors: Simon Whye Kwong Wai, Singapore (SG); Shiao Loong Tang, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/458,195

(22) Filed: Aug. 30, 2023

(65) Prior Publication Data

US 2025/0075779 A1   Mar. 6, 2025

(51) Int. Cl.
| | | |
|---|---|---|
| *F16H 57/08* | (2006.01) | |
| *E21B 23/00* | (2006.01) | |
| *F16H 37/04* | (2006.01) | |
| *F16L 55/32* | (2006.01) | |

(52) U.S. Cl.
CPC ......... *F16H 37/041* (2013.01); *E21B 23/001* (2020.05); *F16L 55/32* (2013.01)

(58) Field of Classification Search
CPC ........ F16H 1/28; F16H 1/2809; F16H 1/2827; F16H 1/2836; F16H 1/2863; F16H 57/082; E21B 23/001
See application file for complete search history.

(56) References Cited

U.S. PATENT DOCUMENTS

| | | | | |
|---|---|---|---|---|
| 11,473,653 B2* | 10/2022 | Fauteux | .................. | F16H 13/10 |
| 11,571,966 B1* | 2/2023 | Park | ...................... | F16H 1/2836 |
| 2008/0045374 A1* | 2/2008 | Weinberg | ............... | H02K 7/116 |
| | | | | 623/24 |
| 2016/0290490 A1* | 10/2016 | Brassitos | ................ | F16H 57/08 |
| 2018/0193994 A1* | 7/2018 | Pellenc | ................... | B25F 5/001 |
| 2020/0157886 A1* | 5/2020 | Fuglestad | ............. | F16H 49/001 |

FOREIGN PATENT DOCUMENTS

| | | | | |
|---|---|---|---|---|
| CN | 206144497 A | | 5/2017 | |
| CN | 111839921 A | | 10/2020 | |
| CN | 111894503 A | | 11/2020 | |
| DE | 10333951 B3 * | | 11/2004 | ........... F16H 49/001 |
| DE | 102012023330 A1 * | | 6/2014 | ........... F16H 1/2863 |
| WO | 2014/081305 A1 | | 5/2014 | |
| WO | 2015/088966 A1 | | 6/2015 | |

OTHER PUBLICATIONS

"Definition of Brunt", retrieved from www.merriam-webster.com (Year: 2024).*
International Search Report; dated May 23, 2024; Application #PCT/US23/73130.

* cited by examiner

*Primary Examiner* — Stacey A Fluhart
(74) *Attorney, Agent, or Firm* — Polsinelli PC

(57) ABSTRACT

A gear system is provided for a wheel of a tractor. The gear system includes a plurality of planet gears and a plurality of rollers. The planet gears are operable to rotate to provide tractive force to the wheel. The rollers are operable to abut against an inner ring of the wheel to reduce a contact force from the wheel contacting a channel on the plurality of planet gears.

20 Claims, 4 Drawing Sheets

GEAR SYSTEM FOR DRIVE ARM OF TRACTOR

FIELD

The present disclosure relates generally to tractors with a gear system. In at least one example, the present disclosure relates to gear systems included in wheels for a drive arm of a tractor for a channel in a wellbore.

BACKGROUND

In pipelines and/or wellbores, tractors may be required to convey the long and heavy tools and tool strings to the designated location for specific operations. Such tractor typically is installed with one or more pairs of drive arms, which can be hydraulically opened to maintain contact against the interior walls of a channel for a wellbore, such as a pipeline and/or a casing. In some examples, the drive arms can be electrically motorized to provide a tractive force required to move the convey tool string forward within the channel.

BRIEF DESCRIPTION OF THE DRAWINGS

Implementations of the present technology will now be described, by way of example only, with reference to the attached figures, wherein.

DETAILED DESCRIPTION

Figure 1:
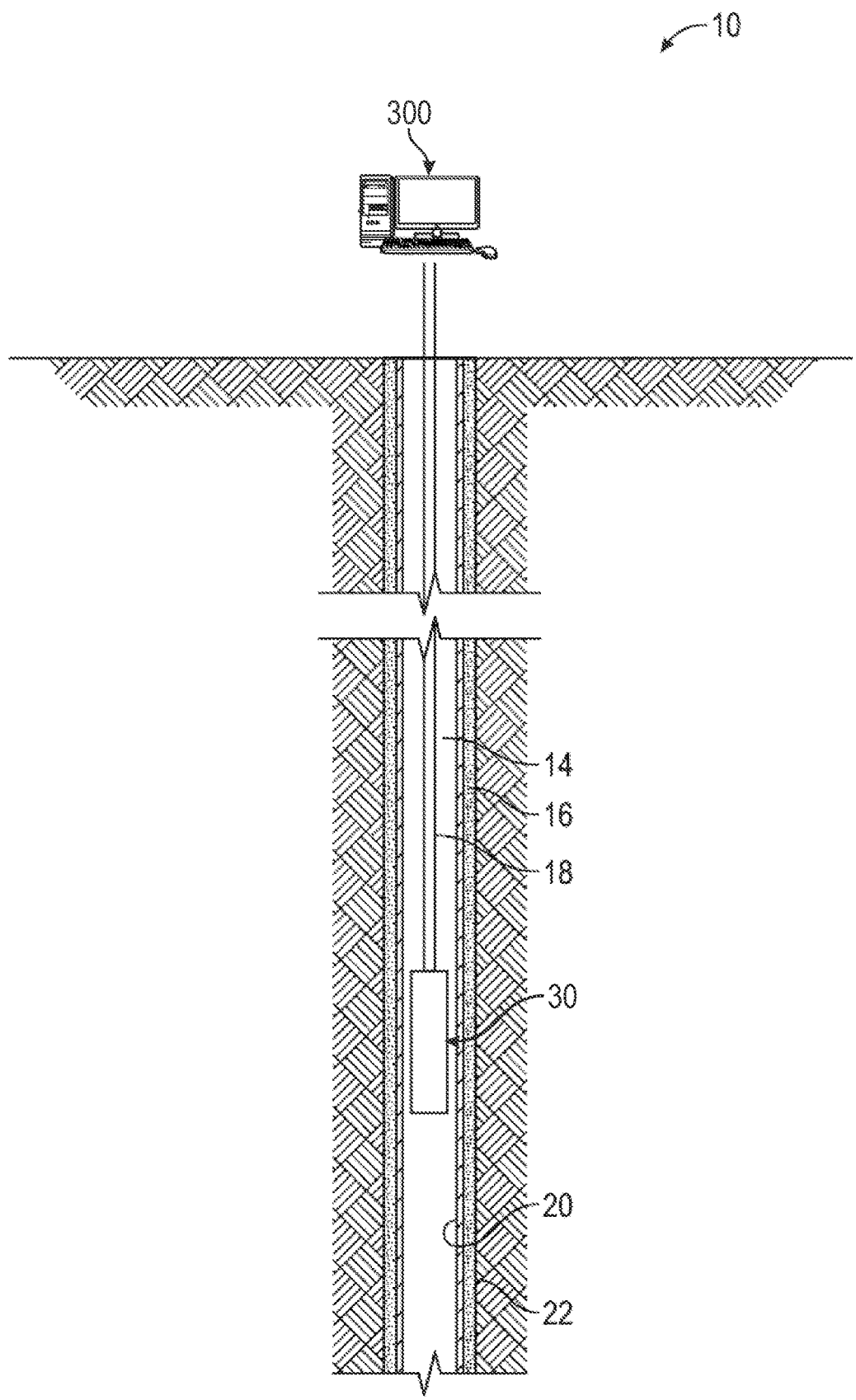
FIG. 1 is a diagram illustrating an exemplary environment for a tool with a tractor according to the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Disclosed herein is a gear system to be incorporated into a wheel of a tractor. The tractor can be operable to propel a tool down a conduit (for example, wellbore, pipeline, casing, etc.). Conventionally, an electromechanical tractor includes one or more drive arms to provide traction to propel the tractor forward. Each drive arm can have individual propulsion with a determined tractive force based on the motor capacity and the friction between the wheel and the wall of the channel. The wheel can be driven by a drive train which can include an electric motor arranged along and parallel to the drive arm, and a transmission drive from the motor to the wheel.

When the diameter of the channel is smaller (for example 2⅛ inches) the size of the tool gets smaller. As the tool and corresponding tractor gets smaller, the components' size of the tractor is reduced but the torque requirements remain high. Conventionally essential components like bearings might not be able to fit in the small envelop. Additionally, the conventional bearings that would be able to fit in the small envelop are not able to withstand the forces imparted thereupon. Hence it is likely to see premature failures in the components of the drive arm.

The gear system and drive arm disclosed herein integrates a roller-planetary gear system directly into the wheel. The compact single stage planet gears provides the required torque capacity, and the rollers provides the bearing support that improves efficiency. Therefore, any other drive components upstream can experience a much lower torque load and mitigate the risk of a fatigue failure and hence, a longer service life.

A gear system 100 for a tractor 30 can be employed in an exemplary wellbore system 10 shown, for example, in FIG. 1. The system 10 includes a tractor 30 traversing a wellbore 14.

As illustrated, for example, in FIG. 1, the wellbore 14 is within an earth formation 22 and has a channel 20 lining the wellbore 14. In some examples, the channel 20 can include a pipeline. In some examples, the channel 20 can include a casing. In some examples, the channel 20 can be held into place by cement 16. The tractor 30 can be disposed within the channel 20 of the wellbore 14 and moved up and/or down the wellbore 14. In some examples, the tractor 30 can be coupled with a conduit 18. In some examples, the tractor 30 can be pulling the conduit 18 through the wellbore 14. The tractor 30 can include, for example, downhole sensors, chokes, and/or valves.

The conduit 18 can be, for example, tubing-conveyed, wireline, slickline, work string, joint tubing, jointed pipe, coiled tubing, and/or any other suitable means for conveying downhole tools using a tractor 30 into a wellbore 14. In some examples, the conduit 18 can include electrical and/or fiber optic cabling for carrying out communications. The conduit 18 can be sufficiently strong and flexible to tether to the tractor 30 through the wellbore 14, while also permitting communication through the conduit 18 to one or more of the processors which can include local and/or remote processors. In some examples, power can be supplied via the conduit 18 to meet power requirements of the tractor 30. For slickline or coiled tubing configurations, power for the tractor 30 can be supplied downhole with a battery and/or via a downhole generator.

It should be noted that while FIG. 1 generally depicts land-based operations, those skilled in the art would readily recognize that the principles described herein are equally applicable to operations that employ floating or sea-based platforms and rigs, without departing from the scope of the disclosure. Also, even though FIG. 1 depicts vertical wellbores, the present disclosure is equally well-suited for use in wellbores having other orientations, including horizontal pipelines and/or wellbores, slanted pipelines and/or wellbores, multilateral pipelines and/or wellbores or the like. Further, in some examples the wellbore system 10 can have a channel 20 already implemented while, in other examples, the system 10 can also be used in open hole applications (e.g., no casing).

Additionally, while the disclosure focuses on sections of the wellbore 14 with a restriction 40 (e.g., a narrowed diameter), such as a restriction in a pipe 38, the tractor 30 and corresponding method can be used for a variety of applications, such as a large opening and/or a gap in the wellbore 14, a fork or multilateral wellbore 14, a bubble in the wellbore 14, and/or to collapse only one drive and/or pair of drives that may not be functioning as desired.

Figure 2A:
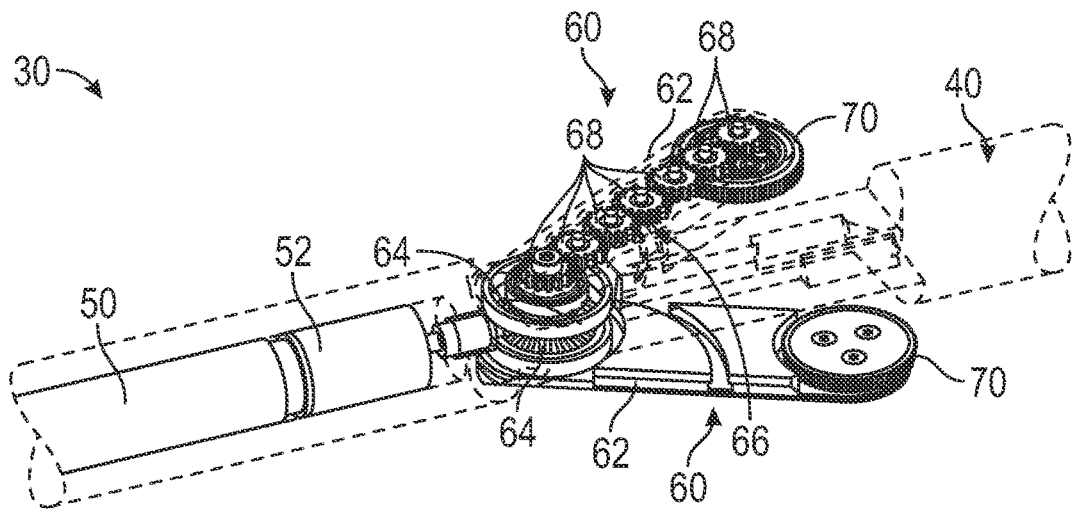
FIG. 2A illustrates the tool with the tractor and a drive arm.
Figure 2B:
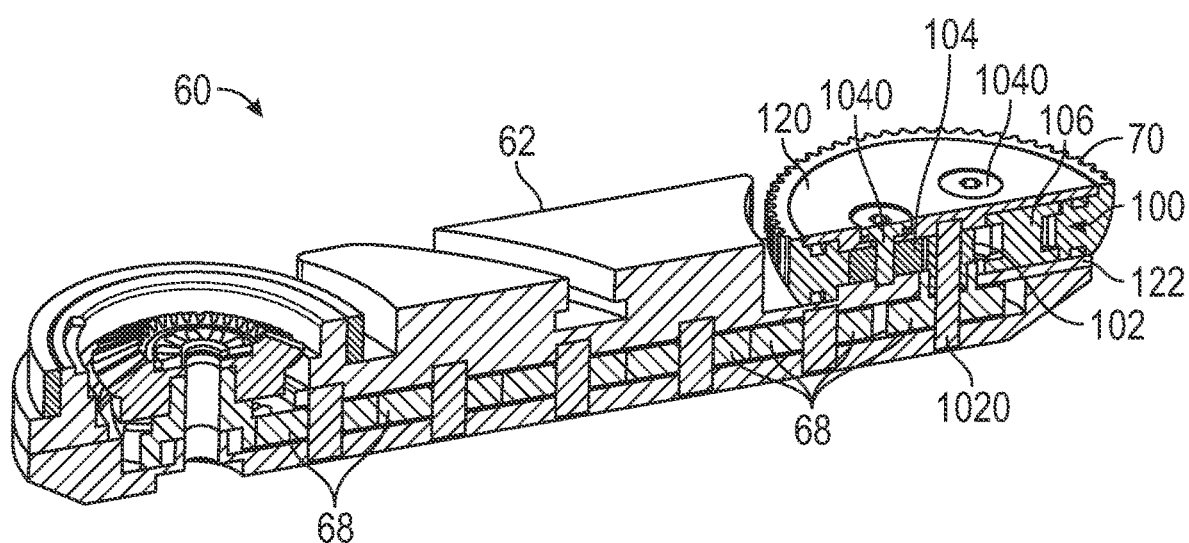
FIG. 2B illustrates a cross-sectional view of the drive arm.

FIGS. 2A and 2B includes a tractor 30 operable to transport a tool 40 through the channel 20. The tractor 30 can include one or more drive arms 60 each with a wheel 70 driven by a motor 50. For example, FIG. 2A illustrates a tractor 30 with two drive arms 60. The two drive arms 60 are paired together. In some examples, the tractor 30 can include one, three, or more drive arms 60. In some examples, the tractor 30 can include one or more pairs of drive arms 60 to propel the tool 40 through the channel 20. In at least one example, the motor 50 can be mounted outside a housing 62 of the drive arm 60 and arranged along and parallel with the tool 40.

The wheel 70 of the drive arm 60 can be connected to the motor 50 via a drive train 66. The drive train 66 can be operable to cause the wheel 70 to rotate by translating the drive from the motor 50 to the wheel 70 with a plurality of gears 64, 68. In at least one example, the drive train 66 can be disposed within the housing 62 of the drive arm 60. In at least one example, the drive train 66 can include an angular gear 64 which rotates due to the gearbox 52 and the motor 50. The angular gear 64 can rotate which causes a plurality of spur gears 68 to rotate. For example, the output shaft of the angular gear 64 can provide the input to the spurs 68 of the drive train 66. The rotation of the spur gears 68 cause the wheel 70 to rotate. For example, the last member of the spur gears 68 in the drive train 66 can drive the wheel 70. In some examples, the drive train 66 can include a belt drive such that translation of the belt drive causes the wheel 70 to rotate. In some examples, the drive train 66 can include a chain drive such that translation of the chain drive causes the wheel 70 to rotate.

Figure 3A:
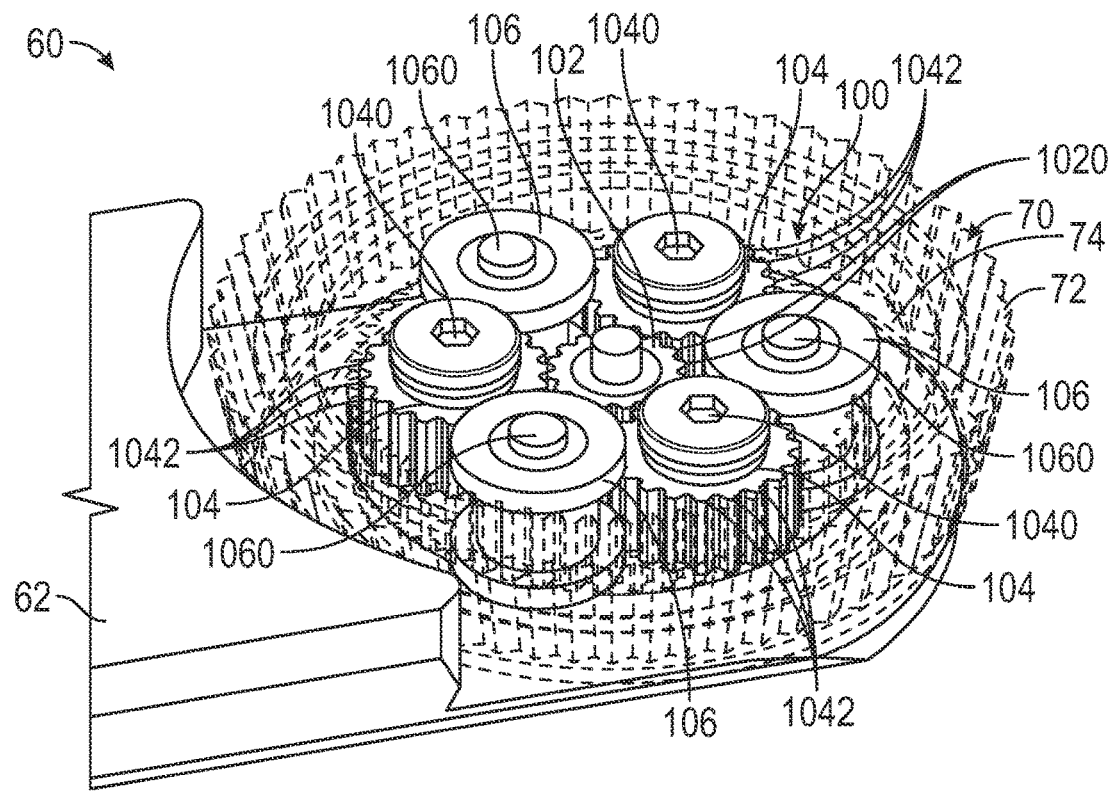
FIG. 3A illustrates a wheel of the drive arm with a gear system.
Figure 3B:
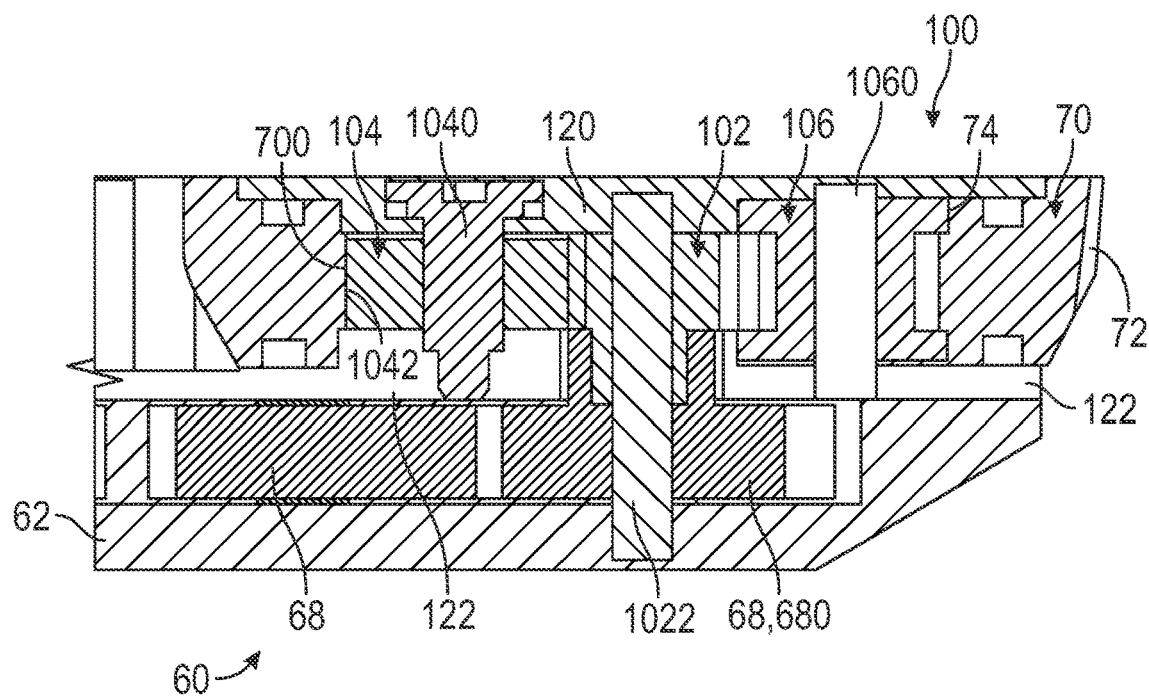
FIG. 3B illustrates a cross-sectional view of the wheel and the gear system.

FIGS. 3A and 3B illustrate the gear system 100 coupled with the drive train 66 and the wheel 70. The gear system 100 can be operable to translate the rotation of the drive train 66 to rotation of the wheel 70. In at least one example, the gear system 100 can be integrated into the wheel 70 such that the gear system 100 causes the wheel 70 to rotate and also provides structural support for the wheel 70. For example, the gear system 100 can be disposed within the treads 72 of the wheel 70. The wheel 70 is then directly connected to the gear system 100.

The gear system 100 can include a sun gear 102, a plurality of planet gears 104, and a plurality of rollers 106. The sun gear 102 can be coupled with the drive train 66 such that the drive train 66 causes the sun gear 102 to rotate. For example, as illustrated in FIG. 3B, the last member 680 of the spur gears 68 in the drive train 66 can cause a shaft 1022 to rotate. In some examples, the shaft 1022 can be the shaft of the last member 680 of the spur gears 68. The shaft 1022 can also be the shaft of the sun gear 102. Accordingly, when the last member 680 of the spur gears 68 rotates, the sun gear 102 also rotates.

The sun gear 102 can cause the plurality of planet gears 104 to rotate when rotated. The planet gears 104 can be disposed circumferentially about and engaged with the sun gear 102 so that when the sun gear 102 rotates, the planet gears 104 also rotate. For example, the sun gear 102 can include sun teeth 1024, and the planet gears 104 include gear teeth 1042. The sun teeth 1024 can be operable to slot together with the gear teeth 1042 of the planet gears 104. Accordingly, rotation of the sun gear 102 causes the planet gears 104 to rotate.

The planet gears 104 can be operable to rotate to provide tractive force to the wheel 70. For example, the gear teeth 1042 of the planet gears 104 can be operable to slot together with wheel teeth 700 of the wheel 70 so that rotating the planet gears 104 causes the wheel 70 to rotate. The wheel teeth 700 can be disposed on the internal surface of the wheel 70 opposite the treads 72 that are operable to interact with the channel 20 to propel the tractor 30. Accordingly, rotation of the sun gear 102 causes the planet gears 104 to rotate which then causes the wheel 70 to rotate. In other words, the input comes from the sun gear 102 and the output is the wheel 70. In some examples, the wheel 70 can include a ring gear. The planet gears 104 can be fixed in place within the wheel 70.

The planet gears 104 are critical to provide the tractive force to drive the wheel 70. However, the planet gears 104 may be the weakest link in that they have the highest tendency to fail. The rollers 106 can be operable to reduce the failure rate of the planet gears 104 such that the service life of the drive arm 60 is increased significantly. The rollers 106 can be operable to abut against an inner ring 74 of the wheel 70 to reduce a contact force from the wheel 70 contacting the channel 20 on the planet gears 104.

Each of the rollers 106 can be operable to rotate about a corresponding roller pin 1060 to reduce friction against the inner ring 74 of the wheel 70. Accordingly, the planet gears 104 do not need as much force to impart the tractive force onto the wheel 70 to propel the tractor 30.

In at least one example, as illustrated in FIG. 3B, the rollers 106 require support to fully receive the contact force from the wheel 70. The roller pin 1060 for each roller 106 can be coupled to a stationary bottom plate 122. Additionally, in some examples, the roller pins 1060 can be coupled to a cover plate 120. In some examples, the cover plate 120 can be coupled to each of the planet pins 1040, 1022 as well as the roller pins 106. Accordingly, a rigid connection can be formed between the bottom plate 122 and the cover plate 120. Forces such as the contact force from the wheel 70 can then be dispersed from the rollers 106 to the roller pins 1060 and into the rigid plates (the cover plate 120 and/or the bottom plate 122).

Figure 4A:
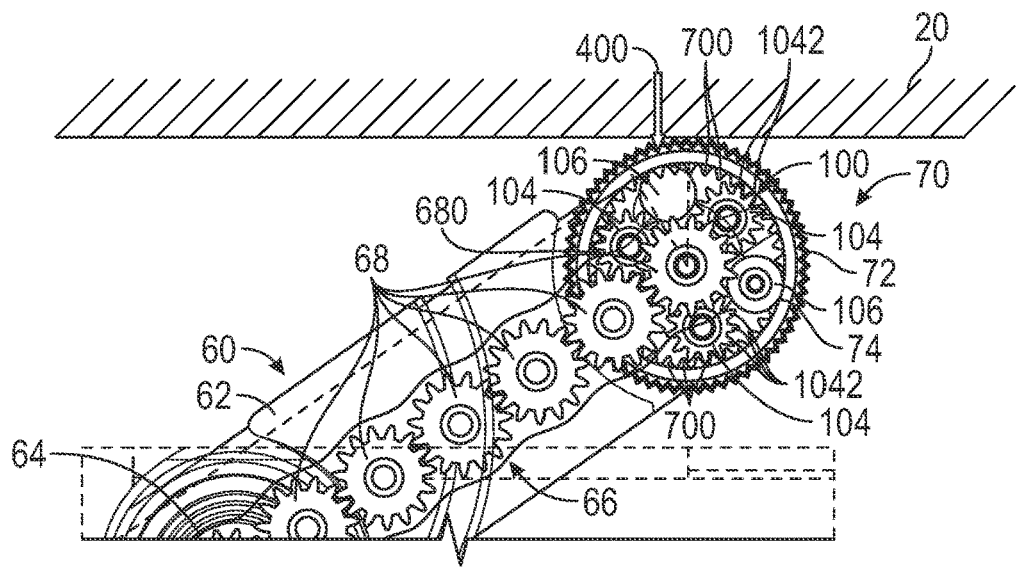
FIG. 4A illustrates the drive arm abutting against a wall of the conduit.
Figure 4B:
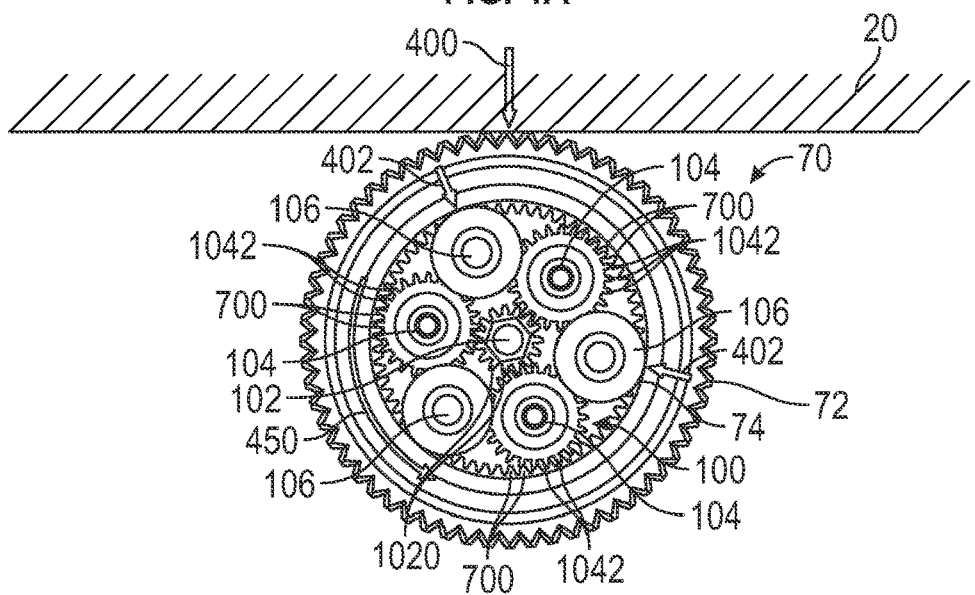
FIG. 4B illustrates the wheel with the gear system propelling against the wall of the conduit.
Figure 4C:
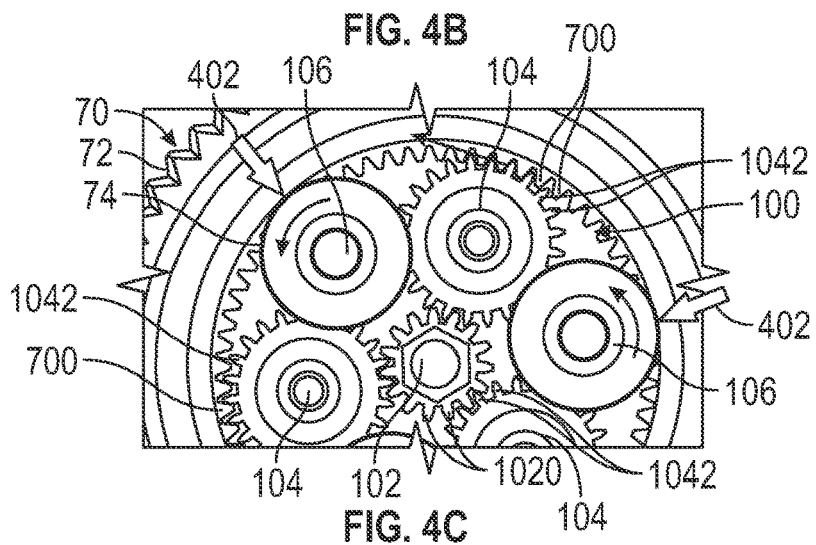
FIG. 4C illustrates an enlarged view of the wheel and the gear system.

FIGS. 4A, 4B, and 4C illustrate the forces imparted on the wheel 70 and the gear system 100, and how the rollers 106 reduce the forces on the planet gears 104 to improve reliability and service life of the wheel 70. Without the rollers 106, performance of the standalone planet gears 104 would be greatly and negatively impacted.

As shown in FIG. 4A, the drive arm 60 and the wheel 70 engage the channel 20. An actuator (not shown) can swivel the drive arm 60 away from the tractor 30 until the wheel 70 contacts the channel 20. A substantial contact force 400 is applied on the channel to provide a sufficient traction to propel the tractor 30 along the channel 20. The contact force 400 can be substantially perpendicular to the channel 20. The wheel 70 can receive the contact force 400 from the channel 20 and transfer a corresponding contact force 402 onto the gear system 100 disposed within the wheel 70.

Referring to FIGS. 4B and 4C, the contact force 402 from the wheel 70 is reacted by the rollers 106. Accordingly, the rollers 106 receive at least a portion of the contact force 402 and reduce the contact force 402 on the planet gears 104. As the wheel 70 presses on the rollers 106 and rotates along direction 450, there is only rolling resistance between the wheel 70 and the rollers 106 which translates to very high efficiency. Also, since the planet gears 104 do not take the brunt of the contact force 402 as the contact force 402 is reduced by the rollers 106, the performance of the planet gears 104 to provide tractive force to the wheel 70 is not affected. Accordingly, the planet gears 104 do not experience radial load from the contact force 402 as the rollers 106 handle the radial load of the contact force 402 and rotate to reduce friction.

In at least one example, as illustrated in FIGS. 4A-4C, the rollers 106 and the planet gears 104 can be positioned circumferentially about the interior of the wheel 70. In some examples, the rollers 106 and the planet gears 104 can be alternatingly positioned about the interior of the wheel 70 and about the sun gear 102. Accordingly, the contact force 402 can be distributed onto the rollers 106 as evenly as possible.

Numerous examples are provided herein to enhance understanding of the present disclosure. A specific set of statements are provided as follows.

Statement 1: A gear system for a wheel of a tractor, the gear system comprising: a plurality of planet gears operable to rotate to provide tractive force to the wheel; and a plurality of rollers operable to abut against an inner ring of the wheel to reduce a contact force from the wheel contacting a channel on the plurality of planet gears.

Statement 2: A gear system as disclosed in Statement 1, wherein each of the plurality of rollers is operable to rotate about a corresponding roller pin to reduce friction against the inner ring of the wheel.

Statement 3: A gear system as disclosed in Statements 1 or 2, wherein each of the plurality of planet gears include gear teeth that are operable to slot together with wheel teeth of the wheel so that rotating the plurality of planet gears causes the wheel to rotate.

Statement 4: A gear system as disclosed in any of preceding Statements 1-3, further comprising a sun gear operable to cause the plurality of planet gears to rotate when rotated.

Statement 5: A gear system as disclosed in Statement 4, wherein the sun gear includes sun teeth that are operable to slot together with gear teeth of each of the plurality of planet gears.

Statement 6: A gear system as disclosed in any of preceding Statements 1-5, wherein the plurality of rollers and the plurality of planet gears are positioned circumferentially about an interior of the wheel.

Statement 7: A gear system as disclosed in Statement 6, wherein the plurality of rollers and the plurality of planet gears are alternatingly positioned about the interior of the wheel.

Statement 8: A drive arm for a tractor, the drive arm comprising: a wheel operable to propel the tractor along a channel; a drive train operable to cause the wheel to rotate; and a gear system coupled with the drive train and the wheel, the gear system comprising: a plurality of planet gears operable to rotate to provide tractive force to the wheel; and a plurality of rollers operable to abut against an inner ring of the wheel to reduce a contact force from the wheel contacting a channel on the plurality of planet gears.

Statement 9: A drive arm as disclosed in Statement 8, wherein each of the plurality of rollers is operable to rotate about a corresponding roller pin to reduce friction against the inner ring of the wheel.

Statement 10: A drive arm as disclosed in Statements 8 or 9, wherein each of the plurality of planet gears include gear teeth that are operable to slot together with wheel teeth of the wheel so that rotating the plurality of planet gears causes the wheel to rotate.

Statement 11: A drive arm as disclosed in any of preceding Statements 8-10, further comprising a sun gear operable to cause the plurality of planet gears to rotate when rotated, wherein the sun gear is coupled with the drive train such that the drive train causes the sun gear to rotate.

Statement 12: A drive arm as disclosed in Statement 11, wherein the sun gear includes sun teeth that are operable to slot together with gear teeth of each of the plurality of planet gears.

Statement 13: A drive arm as disclosed in any of preceding Statements 8-12, wherein the plurality of rollers and the plurality of planet gears are positioned circumferentially about an interior of the wheel.

Statement 14: A drive arm as disclosed in Statement 13, wherein the plurality of rollers and the plurality of planet gears are alternatingly positioned about the interior of the wheel.

Statement 15: A drive arm as disclosed in any of preceding Statements 8-14, wherein the drive train includes a plurality of spur gears.

Statement 16: A drive arm as disclosed in any of preceding Statements 8-15, wherein the drive train includes a belt drive.

Statement 17: A drive arm as disclosed in any of preceding Statements 8-16, wherein the drive train includes a chain drive.

Statement 18: A tractor comprising: a wheel operable to propel the tractor along a channel; a motor; a drive train coupled with the motor, the drive train operable to cause the wheel to rotate; and a gear system coupled with the drive train and the wheel, the gear system comprising: a plurality of planet gears operable to rotate to provide tractive force to the wheel; and a plurality of rollers operable to abut against an inner ring of the wheel to reduce a contact force from the wheel contacting the channel on the plurality of planet gears.

Statement 19: A tractor as disclosed in Statement 18, wherein each of the plurality of rollers is operable to rotate about a corresponding roller pin to reduce friction against the inner ring of the wheel.

Statement 20: A tractor as disclosed in Statements 18 or 19, further comprising a sun gear operable to cause the plurality of planet gears to rotate when rotated, wherein the sun gear is coupled with eh drive train such that the drive train causes the sun gear to rotate.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A gear system for a wheel of a tractor, the gear system comprising:
   a plurality of planet gears operable to rotate to provide tractive force to the wheel; and
   a plurality of rollers operable to abut against an inner ring of the wheel to reduce a contact force from the wheel contacting a channel on the plurality of planet gears,
   wherein the plurality of rollers receive a brunt of a contact force, thereby reducing the contact force on the plurality of planet gears,
   wherein the inner ring is closer to an outer surface of the wheel than the plurality of planet gears.

2. The gear system of claim 1, wherein each of the plurality of rollers is operable to rotate about a corresponding roller pin to reduce friction against the inner ring of the wheel.

3. The gear system of claim 1, wherein each of the plurality of planet gears include gear teeth that are operable to slot together with wheel teeth of the wheel so that rotating the plurality of planet gears causes the wheel to rotate.

4. The gear system of claim 1, further comprising a sun gear operable to cause the plurality of planet gears to rotate when rotated.

5. The gear system of claim 4, wherein the sun gear includes sun teeth that are operable to slot together with gear teeth of each of the plurality of planet gears.

6. The gear system of claim 1, wherein the plurality of rollers and the plurality of planet gears are positioned circumferentially about an interior of the wheel.

7. The gear system of claim 6, wherein the plurality of rollers and the plurality of planet gears are alternatingly positioned about the interior of the wheel.

8. A drive arm for a tractor, the drive arm comprising:
   a wheel operable to propel the tractor along a channel;
   a drive train operable to cause the wheel to rotate; and
   a gear system coupled with the drive train and the wheel, the gear system comprising:
     a plurality of planet gears operable to rotate to provide tractive force to the wheel; and
     a plurality of rollers operable to abut against an inner ring of the wheel to reduce a contact force from the wheel contacting a channel on the plurality of planet gears,
   wherein the plurality of rollers receive a brunt of a contact force, thereby reducing the contact force on the plurality of planet gears,
   wherein the inner ring is closer to an outer surface of the wheel than the plurality of planet gears.

9. The drive arm of claim 8, wherein each of the plurality of rollers is operable to rotate about a corresponding roller pin to reduce friction against the inner ring of the wheel.

10. The drive arm of claim 8, wherein each of the plurality of planet gears include gear teeth that are operable to slot together with wheel teeth of the wheel so that rotating the plurality of planet gears causes the wheel to rotate.

11. The drive arm of claim 8, further comprising a sun gear operable to cause the plurality of planet gears to rotate when rotated, wherein the sun gear is coupled with the drive train such that the drive train causes the sun gear to rotate.

12. The drive arm of claim 11, wherein the sun gear includes sun teeth that are operable to slot together with gear teeth of each of the plurality of planet gears.

13. The drive arm of claim 8, wherein the plurality of rollers and the plurality of planet gears are positioned circumferentially about an interior of the wheel.

14. The drive arm of claim 13, wherein the plurality of rollers and the plurality of planet gears are alternatingly positioned about the interior of the wheel.

15. The drive arm of claim 8, wherein the drive train includes a plurality of spur gears.

16. The drive arm of claim 8, wherein the drive train includes a belt drive.

17. The drive arm of claim 8, wherein the drive train includes a chain drive.

18. A tractor comprising:
   a wheel operable to propel the tractor along a channel;
   a motor;
   a drive train coupled with the motor, the drive train operable to cause the wheel to rotate; and
   a gear system coupled with the drive train and the wheel, the gear system comprising:
     a plurality of planet gears operable to rotate to provide tractive force to the wheel; and
     a plurality of rollers operable to abut against an inner ring of the wheel to reduce a contact force from the wheel contacting the channel on the plurality of planet gears,
   wherein the plurality of rollers receive a brunt of a contact force, thereby reducing the contact force on the plurality of planet gears,
   wherein the inner ring is closer to an outer surface of the wheel than the plurality of planet gears.

19. The tractor of claim 18, wherein each of the plurality of rollers is operable to rotate about a corresponding roller pin to reduce friction against the inner ring of the wheel.

20. The tractor of claim 18, further comprising a sun gear operable to cause the plurality of planet gears to rotate when rotated, wherein the sun gear is coupled with the drive train such that the drive train causes the sun gear to rotate.

* * * * *